April 14, 1964  W. D. ALLINGHAM  3,128,544
METHOD OF MAKING A PANEL
Filed April 28, 1959  3 Sheets-Sheet 1

INVENTOR.
WILLIAM D. ALLINGHAM
BY Reynolds, Beach + Christensen
ATTORNEYS

April 14, 1964 W. D. ALLINGHAM 3,128,544
METHOD OF MAKING A PANEL
Filed April 28, 1959 3 Sheets-Sheet 2

INVENTOR.
WILLIAM D. ALLINGHAM
BY Reynolds, Beach + Christensen
ATTORNEYS

April 14, 1964     W. D. ALLINGHAM     3,128,544
METHOD OF MAKING A PANEL

Filed April 28, 1959                          3 Sheets-Sheet 3

INVENTOR.
WILLIAM D. ALLINGHAM
BY
Reynolds, Beach & Christensen
ATTORNEYS

3,128,544
METHOD OF MAKING A PANEL
William D. Allingham, 12223 25th Ave. SW.,
Seattle 66, Wash.
Filed Apr. 28, 1959, Ser. No. 809,400
12 Claims. (Cl. 29—420)

This invention concerns a method of making a lightweight structural component or panel, particularly useful in contoured forms but also valuable in planar form. In a representative form, it includes at least one, but more often two or more base sheets, spaced apart but joined by a mass of particulate ferromagnetic or magnetizable material (as that term is hereinafter defined) arranged in the form of a multitude of individual filaments or struts outstanding from the single sheet, or extending between the spaced sheets, with multitudinous intervening voids, their disposition thus being initially effected solely by magnetic forces acting upon the particles, and the particles while so disposed being fixed, bonded or "frozen" permanently by any of various procedures which effect their fixation relative to one another and to the sheet or sheets while they are held in position by the magnetic forces. No base sheet or sheets is or are essential, since the particulate material can be disposed in the filamentary disposition by magnetic forces, and "frozen" thus, with a covering sheet or sheets later applied if desired or necessary, or omitted altogether if not required in the use to which the panel is put.

The structural component made by the method of this invention may, for example, consist of two base or face sheets of aluminum alloy or stainless steel spaced apart, and a core of a multitude of "frozen" filaments of iron or steel particles extending between the sheets and "frozen" by a sintering, brazing, or other bonding procedure. A panel of this nature might serve as a structural skin or load-bearing panel for aircraft construction, replacing the known honeycomb sandwich type of panel, and possessing the same advantages and others not readily realizable in honeycomb sandwiches, among such advantages that of dependable, thorough and uniform bonding throughout and strength in all areas of the panel. The invention concerns also the method by which such component is manufactured, the primary essential whereof is that the loose, unconfined particles are disposed in and held in their final disposition, which may be described as generally parallel filaments, with many voids between the filaments, by magnetic forces, and while so held are "frozen" in place. Factors such as the nature, composition, size, or shape of the particles are of secondary importance, so long as they are subject to attraction by magnetic forces. The same is true of the presence or nature of the sheet or sheets, except that if used, they need not be affected by magnetic forces. The manner in which or the agent by which the fixation or "freezing" of the particles is effected is also of secondary importance, and may well vary in accordance with the conditions to which the panel will be subjected during manufacture or in use.

Honeycomb core sandwiches have had certain limitations and weaknesses. They serve well when the sandwich panels are planar, but must usually be more or less planar initially, and will not conform to appreciably changed nor sharply curved contours, for this tends to crush the cell walls of the core, and so to weaken the core and panel. Very close tolerances must be observed in the spacing between face sheets, otherwise there is discontinuity of contact between the edges of the cell walls and the face sheets, which causes faulty bonding in the non-contacting areas, leading to progressive breakdown during use. If a marginal frame or reinforcement is required, this must fit within very close tolerances. Penetration of a honeycomb core sandwich, for the securement of through bolts or the like, also has a locally weakening effect. The cells of a honeycomb core are normally completely closed, wherefore there is no possibility of circulating a fluid, such as a coolant, for example, through the core, when the panel is subject to high temperature in use.

The present invention, when embodied in sandwich form, will overcome the above drawbacks. In particular, it can be contoured in many curved forms, wherein the filaments are substantially normal to the local surface at each face, and so equally resistant throughout to crushing; tolerances are less important, for the core material bridges varying gaps; penetration will have much less weakening effect; because of the more closely spaced interface filaments, affording greater overall strength, the faces can be thinner and lighter; and the core part can be given any desired cellular or channeled arrangement, in the latter of which circulation can occur through the core.

In a somewhat broader aspect the invention need not be embodied in sandwich form; namely, two faces and an interposed core. It may, for instance, enable the construction of a reinforced panel consisting of a base sheet and a rigid lamination built up thereon of particles arranged in spaced filaments or diaphragms, without an overlying sheet. In this latter form, it may be useful per se, or it may serve as a means of bonding another material, such as a ceramic, temperature-resistant coating upon a base sheet of metal or of other suitable material. Also, it may consist of no more than a core of particulate material disposed by magnetic forces in a large number of filaments, and frozen in that form, without any base sheet, or with a base sheet or sheets applied to the core subsequently to the freezing of the particulate material in filamentary form. On the other hand, this invention may be incorporated in a multi-layer sandwich, with differing orientation of the particles if desired in alternate cores.

In addition to the objects indicated above, this invention aims to produce such articles which are simply and inexpensively produced, which need not incorporate continuous walls for core cells, although such walls can be produced, but which incorporate a core formed usually with a multitude of individual, relatively closely spaced filaments interconnecting opposite faces, uniformly distributed over and generally normal to the loaded area, and transmitting stresses between the faces. Because of the uniformity of distribution of the filaments, and the reliability of the bond between the particles of each filament and the filaments and the respective faces, the panels are not subject to breakdown under stress, progressing from an area of initial weakness. Because of the filamentary nature of the core, and the multitudinous voids between filaments, such a panel will compare favorably in strength/weight ratio with honeycomb core panels. The face sheets are not, in all cases, essential for a core of such filamentary form, without face sheets, will still have usefulness in certain circumstances.

The accompanying drawings illustrate diagrammatically the successive steps of the method involved, and several representative forms of the article.

FIGURE 10 is in the nature of a plan view of the initial step, representing the particles in amorphous grouping, while

Figure 1:
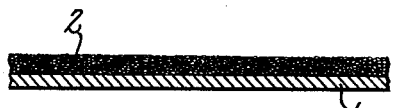
FIGURE 1 is a cross-sectional view of an initial step in the method.
Figure 2:
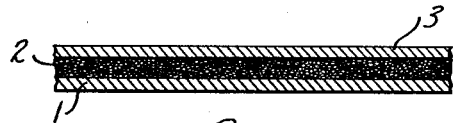
FIGURE 2 is a like view of a possible next step, when the article is to have the form of a sandwich.

Briefly stated, and having reference to the sandwich formation such as is illustrated generally in FIGURES 1 to 12 for purposes of illustration, according to this invention two faces or sheets, which can be of metal such as aluminum alloy, iron, steel, or other suitable material, including even plastic materials, are spaced apart by the intended thickness of the sandwich, with a mass or bed of particulate material in an amorphous grouping between them, but less in volume than the included volume between the faces. Separation of the faces to the required distance may occur from a disposition wherein both sheets contact the interposed particulate material. This particulate material consists of particles of magnetizable material. Their size is not material nor their shape, as will be explained hereinafter, but they could be granular. The precise material is not critical, so long as it is magnetizable, or ferromagnetic. Iron or steel filings, nickel, cobalt, or magnetic oxides, alloys, or ores such as magnetite, could serve, for example. These particles are acted upon by magnetic force passed through the sandwich from face to face, or from edge to edge, and orient themselves in filamentary or diaphragmatic form, along the lines of magnetic flux. Normally they are normal to the immediate area of each face, and contact each face in a multitude of such filaments rather uniformly distributed over the area or concentrated in a desired pattern, as may best suit the conditions of use. When thus influenced and oriented they are "frozen" in this disposition, so that upon discontinuance of the magnetic force they remain so arranged, and are bonded to the respective sheets and to one another.

By "freezing" is meant that a fixation or solidification of the filaments and particle groupings occurs, in situ, and the word has no connotation as to temperature. The particles might be frozen by sintering, brazing or fusing them, using induction heating, for example, or dielectric heating when the particles incorporate a resin binder capable of being thus "frozen." Freezing might be accomplished by the setting of a resin, cement, or other binder incorporated with and intimately intermingled with the magnetizable particles, but not embedding the particles as a solid matrix. Again, an electrodeposit might fill interstices between and encase the particles. The essential thing is that the particles, being magnetizable, are oriented by the magnetic force, and while so arranged and held are frozen. The result is a light, strong sandwich, not restricted to any particular contour or curvature, in full contact with each sheet throughout its area, pentration whereof at any one point does not appreciably weaken adjacent areas, and capable of transmitting structural loads substantially indefinitely as to time, and capable of defining cells or channels within the core, if originally oriented or grouped to that end.

The face sheet or sheets may be of various materials, and thicknesses, depending upon the usage to which the article is to be put and the resultant conditions, such as temperature, stress, and the like. Plastic sheets might be substituted for metal, under some circumstances. The core particles, also, may be of various materials, depending upon similar factors, and some such materials have been suggested above. If granular particles are used, they can be arranged in a multitude of individual filaments, or the spacing between such filaments may decrease to zero in certain directions, whereby they will merge into diaphragms, or in place of such granular particles, small crystal filaments, commonly called "whiskers" may be used, for they are free of weakening imperfections, and thus possess great strength. The strength of the filamentary core can be supplemented by the freezing step. For example, a sintering or brazing of the particles, or the intermixing of a solder, or the incorporation with them of cement or a high strength epoxy resin or the like will strengthen them. If resistance to temperature is required, the particles themselves may be of materials such as magnetite, magnetic ferrites (formulations of oxides of iron, nickel, manganese, zinc, magnesium, etc.), bonded or frozen by heating with a binder such as aluminum phosphate or sodium silicate.

It will illustrate the invention by describing certain typical forms and methods as illustrated in the drawings. These are to be taken as illustrative but not restrictive.

FIGURE 1 illustrates an initial step in the method of making a sandwich. A backing sheet or one face sheet of the sandwich indicated at 1 is disposed horizontally, and upon it are distributed a mass of particles 2 of the magnetizable material. Normally, the distribution while amorphous would be more or less uniform over the area of the sheet 1. Next, a second sheet 3 (FIGURE 2) is disposed in generally parallel relation to the sheet 1. The sheet 3 may be at a spacing from the sheet 1 considerably in excess of the volume occupied by the particles 2, yet close enough to the particles 2 that mangetic force passing through and between the faces 1 and 3 will attract these particles 2. Alternatively, the face 3 may contact the upper surface of the mass of particles 2 initially, and be withdrawn to a greater spacing from the face 1 after and during passage of the magnetic forces, as explained below. The spacing between faces may be determined initially or ultimately by a marginal element 18, of non-magnetic material, interposed between the faces.

Figure 3:
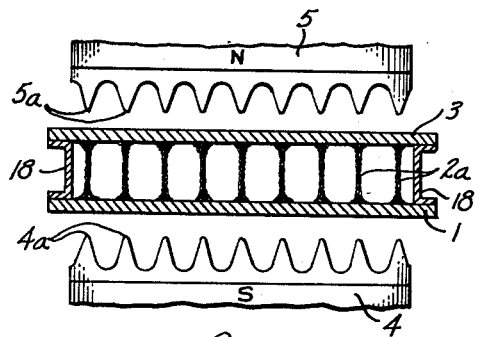
FIGURE 3 is a similar view of a following step.
Figure 6:
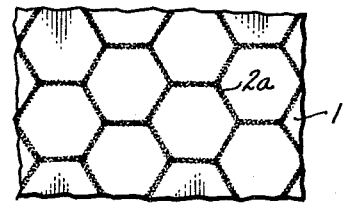
FIGURES 6 and 6A are plan views, with a top sheet removed, illustrating different cellular and channeled patterns into which the core can be formed.
Figure 6A:
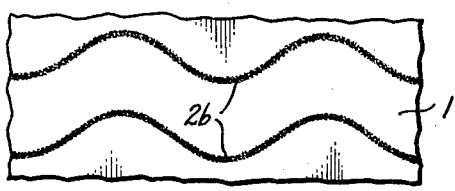

Opposite poles 4 and 5 of a magnet are disposed externally of the sheets 1 and 3 and these would normally be in contact with the faces, but depending upon the strength of the magnetic flux might be spaced therefrom as they are shown in FIGURE 3. Electromagnets would normally be used, so that passage and cessation of the magnetic forces can be controlled. Magnetic flux passing between the poles 4 and 5 will attract the particles 2, regardless of any variation in the spacing between faces, and will distribute them in closely spaced filaments or similar grouping indicated at 2a, extending between and contacting the inner faces of the sheets 1 and 3. If the pole tips are planar, the filaments will be quite uniformly distributed throughout the core area. On the other hand, if the tips of the poles 4 and 5 be patterned as indicated at 4a and 5a, or if replaceable or interchangeable patterned tips of magnetic material be attached to plane pole tips, the spacing between the filaments will be closed along paths extending parallel to the plates or other mold faces and the filaments 2a will be grouped in a corresponding pattern. Thus, as indicated in FIGURE 6, the pattern may be closed or cellular or, as indicated in FIGURE 6A, the pattern may define spaced walls 2b which define between them a channel which can serve for the circulation of a fluid.

Figure 4:
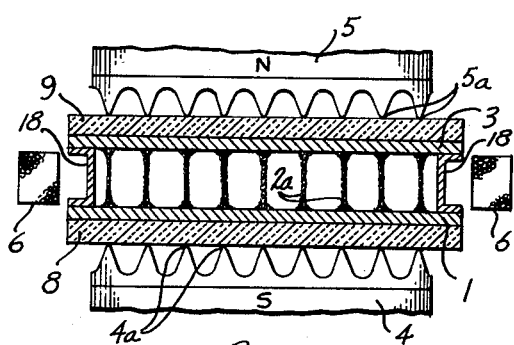
FIGURE 4 is a like view of a final step, according to one exemplification of the method.

The final step involves the freezing of the particles in their filamentary or patterned arrangement and, as has been indicated above, this can be accomplished in a variety of ways. For example, as shown in FIGURE 4, an induction coil represented by the numeral 6 may be employed to produce heat which will fuse the particles 2a (assuming them to be coated with a fusible material or mixed with a powdered fusible material) in their patterned form and will bond them to the sheets 1 and 3 with which they are in contact. To protect the magnets 4 and 5 from heating, heat insulation sheets of non-magnetic material 8 and 9 may be interposed between the magnet poles and the respective sheets 1 and 3. Non-magnetic facing sheets are generally preferable when patterned pole tips are used, for if the sheets 1 and 3 were of magnetic material, the pattern of the tips would not be as sharply reproduced in the pattern of the filament-forming particles of the core.

Figure 5:
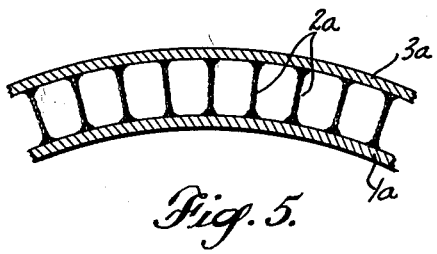
FIGURE 5 is a cross-sectional view of an article according to this invention, illustrating in a simple form its adaptability to curved contours.

It will be seen from FIGURE 5 that such a method of forming a sandwich adapts itself well to a contoured or curved form, about one or about two or more axes in space. Here the sheet 1a and the sheet 3a are each curved, although they lie generally parallel. Conjointly, they follow a curved contour, which in a honeycomb core is difficult to achieve, and usually is per se weakening. The magnet poles would be similarly curved, wherefore the particles 2a would be aligned in filamentary groupings, whatever their particular pattern, wherein they lie generally normal to the faces 1a and 3a at the points where they contact the same. In consequence, any filamentary bridge between the sheets 1a and 3a or any cellular formation which the particles may assume has its cell walls oriented substantially perpendicularly to the faces, in which orientation the resistance to crushing is greatest, nor are these walls crushed by the necessity for subsequently contouring the sheets. There is a practical limit, determined by the stress which the panel may be required to resist in use, to the curvature permissible.

Figure 7:
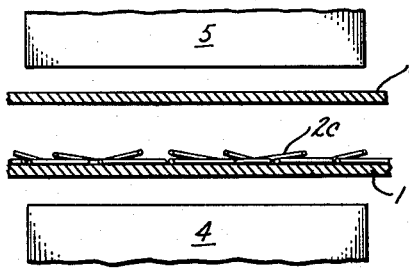
FIGURE 7 is a cross-sectional view, similar to FIGURE 2, of a different core material.
Figure 8:
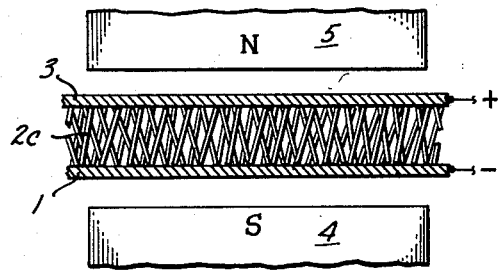
FIGURE 8 illustrates the same in a final step, similar to FIGURE 4.

The particles are not necessarily of granular form, although when they are in granular form, various types of magnetizable materials may be employed, and there might be incorporated and intermingled with them cements, catalytic or thermosetting resins, or the like which, upon setting, will freeze the particles in the pattern which they assume under the influence of magnetic flux. There may be instances, however, when the particles should be other than granular, and such an instance is illustrated in FIGURES 7 and 8. Here, the particles 2c are of somewhat elongated threadlike or fin-like form, of a length slightly greater than the spacing between the faces. They are distributed in amorphous relationship upon the sheet 1 in the first step of the method. Upon the placement of the sheet 3 and the energization of the magnets 4 and 5, the magnetizable particles 2c will extend between the sheets 1 and 3, contacting each thereof and crisscrossing one another, thus providing lateral bracing in all directions. While they are thus held, a current may be passed between the plates 1 and 3 through the particles 2c and this current may resistance-weld or braze the particles 2c in their upstanding disposition to freeze them thus, or if they were preliminarily tinned, they would be soldered into a frozen mass. A resin or like binder incorporated with the particles might be set merely by heating with warm air.

Figure 9:
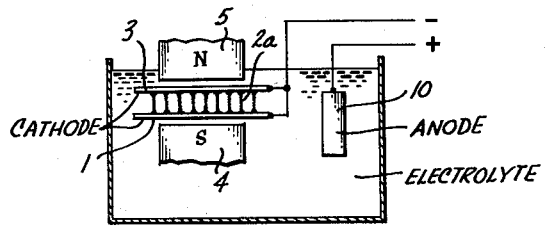
FIGURE 9 is a cross-sectional view on a reduced scale, illustrating a different way of accomplishing the final step.

Another type of freezing is illustrated in FIGURE 9. Here, the particles are assumed to be substantially in the stage of the method represented by FIGURE 3, but are immersed in an electrolyte and the particles and the sheets 1 and 3 jointly constitute a cathode which, in conjunction with an anode 10 and the passage of a current between the anode and the cathode as defined above, will effect deposition of an electro-deposit upon and between the filaments 2a and this electro-deposit will freeze the particles in their assumed position, so that when the magnetic forces are discontinued, the filaments will still remain in their filamentary disposition. Further strengthening can be accomplished, if desired, by fusing the particles and the sheets in their relationship as produced by the electrodeposition.

Figure 10:
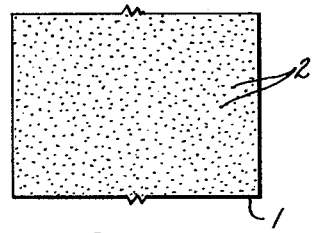
Figure 11:
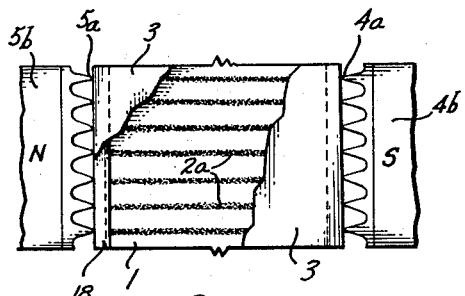
FIGURE 11 represents a later step, wherein the particles are grouped in a channeled pattern.

FIGURE 10 is intended as a plan view looking, for instance, upon the particles as they are distributed in FIGURE 1. These particles can be distributed in any given disposition. In the descriptions above, the magnetic forces have passed through and between the plates 1 and 3. In FIGURE 11, however, the poles 4a and 5a are illustrated as spaced at opposite edges of the panel, their ends being properly patterned, again as indicated at 4a and 5a. The particles may be thus arranged in the form of diaphragms extending in parallelism between the opposite edges of the panel. In this case, sheets 1 and 3, if both are used, must be of non-magnetic material. It is not essential that the cover sheet 3 be employed when the magnetic forces are thus applied. If the cover 3 be omitted, the particles will still arrange themselves in the disposition indicated, steps being taken, of course, to prevent their being drawn outwardly beyond the panel 1, and when frozen in this disposition by any of the freezing steps indicated above or equivalents thereof, the single sheet panel will be reinforced by the particles frozen in the pattern indicated at 2a in FIGURE 11.

Figure 12:
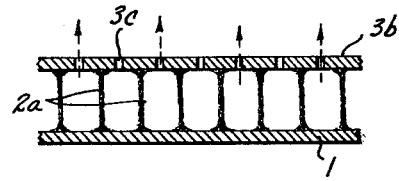
FIGURE 12 is a cross-sectional view of the article, in a form adapted for transpiration cooling.

The panel illustrated in FIGURE 12 is intended primarily to facilitate cooling by transpiration of a liquid or gaseous coolant. The sheet 3b is porous, pores 3c being suggestive of this, and the sheet 1 may be porous or non-porous. The liquid or gaseous coolant can flow into the voids between filaments 2a, and transpire through the pores 3c, and so will remove and dissipate heat affecting the panel. The filaments serve as a multitude of fins to absorb and conduct heat from the skin 3b, and the sweating through the pores 3c also cools this skin. Similar principles with or without the pores may be employed in a heat exchanger.

As has already been indicated, it is not essential that the filaments extend between two faces; they might, for example, stand up from a surface of a single sheet, under the influence of magnetic forces, and be frozen thus. This would produce a highly roughened, strengthened panel, which could serve to support and anchor an applied coating, a ceramic layer for example. Such ceramic coating will enable the formation of a panel of any desired thickness directly upon a backing sheet 1, for thermal insulation when that may be desirable.

Going a step farther, the employment of faces is not essential, for the core itself may have usefulness without a face at either surface thereof, or if a face or faces are necessary, the same can be applied to a previously formed core of the magnetically oriented, frozen particulate material. FIGURES 13 to 17 show how such a core, or a faced panel with such a preformed core, can be made. Such a panel might be found highly useful as a body or other panel for an automobile.

Figure 13:
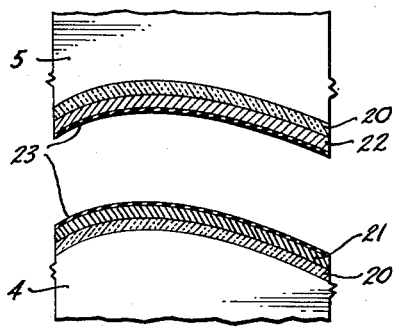
FIGURE 13 is a cross-sectional view of a first step when a core or a panel is to be made up without faces, or with faces later applied.
Figure 14:
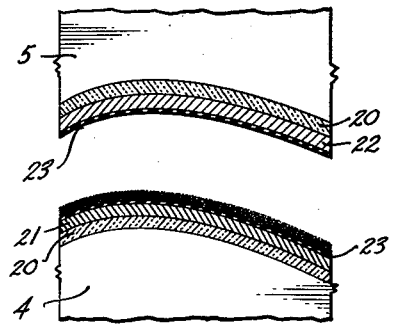
FIGURE 14 is a similar view of a second step.
Figure 15:
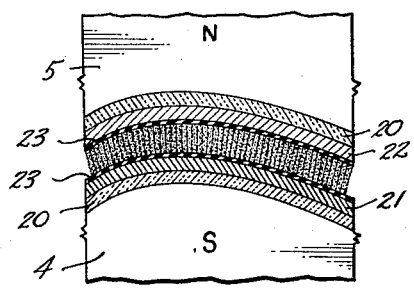
FIGURE 15 is a like new of a final step in the making of such a core.
Figure 16:
FIGURE 16 is a cross-sectional view of a finished core made as suggested in FIGURES 13, 14 and 15.
Figure 17:
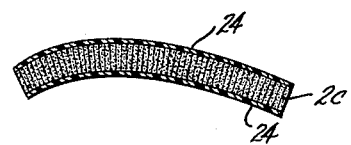
FIGURE 17 shows such a core with subsequently applied opposite faces.

In FIGURES 13, 14 and 15, the poles 4 and 5 of a magnet would usually be contoured to the required curvature, which can be quite complex, but should not be unduly abrupt if maximum resistance to crushing is a requirement. Thermal insulation 20 may be interposed between the poles and the mold area, especially if the freezing is to be accomplished by a heating of the core material. Platens 21 and 22 are next interposed, and these would be contoured to the desired shape. Any suitable provision is made for heating the platens, as has been suggested above. The core-contacting surfaces of the platens are desirably coated with a parting agent 23, such as a hydrocarbon or a silicone grease.

Particulate material of the nature already indicated is interposed between the platens, and is disposed in filamentary form by magnetic forces intermediate the poles 4 and 5. If this particulate material is mixed with a thermosetting binder resin, for example, heating of the platens 21, 22 in any suitable manner will freeze the particles in their assumed filamentary form. After freezing and opening of the mold area, the finished core 2c is removed, the parting agent at 23 facilitating this. The core will have been frozen in the desired contoured form, as in FIGURE 16, and for some uses nothing further need be done. If faces are desired, a tough plastic or ceramic coating 24 may be applied, as by spraying, dipping, or in any suitable manner, to complete a contoured sandwich.

As will be understood, the article and the method of this invention are not intended to be restricted to any particular freezing step nor any particular disposition or pattern of the particles, nor to any particular form or composition of the sheet or sheets, nor of the particles, so long as the particles are magnetizable. It is the arrangement of the particles by the passage of the magnetic forces through them and in a given pattern, or in the patternless form, and the freezing of the particles in this disposition by any of the freezing steps suggested or any other suitable freezing steps, which constitute the essence of the present invention.

Such articles will have many possible uses. Most obviously, the article can be a lightweight yet strong and rigid panel, nose cone, rocket motor nozzle or combustion chamber wall, or other structural element, with one or with two spaced sheets, or in multilayer form. By arranging for circulation of a fluid through the panel cooling effects can be obtained, and if one sheet be porous, transpiration cooling is possible. Thermal insulation, ceramic or otherwise, is readily applicable. Liquid or gas filters may be so formed, or the core can hold a catalyst in chemical processing applications. The completed panel, subdivided into thin layers parallel to the extent of the filaments, may serve as electron tube screen grids or cathode. A multilayer form employing face sheets of a suitable dielectric material could serve as an electrical condenser. If greater porosity is required than is conveniently obtainable by the method outlined above, there can be incorporated in the filaments a powdered material that can be dissolved, leached, evaporated, or melted away. It is not intended, therefore, to restrict the invention to the field of structural panels or formed structural articles, yet it presently seems most useful in that field.

I claim as my invention:

1. A method of forming a structural member comprising introducing a mass of bodies into a cavity separating a pair of plates, applying a directional force field across the cavity so that its lines of force extend in substantially normal relationship to the plates, said mass having a volume that is smaller than that of the cavity so as to permit random movement of the bodies within the cavity, said bodies having a length at least equal to the spacing between the plates and being responsive to the field to orient themselves in spaced columnar distributions along the concentrations of force lines, thereby forming a multiplicity of struts between the plates, effecting a bond between the struts and each of the plates, thereby forming an integral panel, and thereafter effecting relative removal of the panel from the field.

2. A method of forming a structural member comprising introducing a mass of magnetizable bodies into a cavity separating a pair of mold faces, at least one of said faces being formed by a plate, said mass having a volume that is smaller than that of the cavity so as to permit random movement of the bodies within the cavity, applying a magnetic field across the cavity so that its lines of force extend in substantially normal relationship to the mold faces, whereupon the bodies are induced to orient themselves in spaced columnar distributions along the concentrations of force lines, the quantity of the bodies being sufficient to enable the columnar distributions to bridge the spacing between the mold faces, effecting a bond between the bodies in the columnar distributions and the plate, thereby forming an integral panel member having a multiplicity of struts, and thereafter effecting relative removal of the panel member from the field.

3. A method according to claim 2, wherein the bodies are of ferromagnetic material.

4. A method according to claim 2, wherein at least one of the mold faces has a curved surface to confer a corresponding curvature on the profile formed by the adjacent end portions of the struts.

5. A method according to claim 2 further comprising controlling the magnetic field so as to close the spacing between the columnar distributions along paths extending parallel to the mold faces, and effecting a bond also between the bodies in the columnar distributions along the length of the paths.

6. A method according to claim 2, wherein a panel member is formed having a single plate with a multiplicity of struts outstanding therefrom, said method further comprising securing a second plate to the free ends of the struts to form a core structure having continuous end walls.

7. A method according to claim 2, wherein the bodies are coated with a binder when introduced to the cavity and the binder is activated after their orientation to effect the bond between them and the plate.

8. A method according to claim 2, wherein the bodies are fused together after their orientation to effect the bond between them and the plate.

9. A method according to claim 2, wherein a bonding agent is electrodeposited along the columnar distributions to effect the bond between the bodies therein and the plate.

10. A method according to claim 2, wherein the step of effecting relative removal of the panel member from the field includes demagnetizing the panel member.

11. A method of forming a structural member comprising introducing a mass of magnetizable bodies into a cavity separating a pair of mold faces, said mass having a volume that is smaller than that of the cavity so as to permit random movement of the bodies within the cavity, applying a magnetic field across the cavity so that its lines of force extend in substantially normal relationship to the mold faces, whereupon the bodies are induced to orient themselves in spaced columnar distributions along the concentrations of force lines, controlling the magnetic field so as to interconnect the columnar distributions in a core structure having continuous walls and multitudinous voids therewithin, the quantity of the bodies being sufficient to enable the core structure to bridge the spacing between the mold faces, effecting a bond between the bodies in the core structure to integrate the same, and thereafter effecting relative removal of the core structure from the field.

12. A method of forming a structural member comprising introducing a mass of magnetizable bodies into a cavity separating a pair of mold faces, said mass having a volume that is smaller than that of the cavity so as to permit random movement of the bodies within the cavity, applying a magnetic field across the cavity so that its lines of force extend in substantially normal relationship to the mold faces, whereupon the bodies are induced to orient themselves in spaced columnar distributions along the concentrations of force lines, the quantity of the bodies being sufficient to enable the columnar distributions to bridge the spacing between the mold faces, controlling the magnetic field so as to close the spacing between the columnar distributions along closed paths extending parallel to the mold faces, effecting a bond between the bodies in the columnar distributions along the length of the paths, thereby forming a honeycomb structure, and thereafter effecting relative removal of the honeycomb structure from the field.

References Cited in the file of this patent

UNITED STATES PATENTS

| | | |
|---|---|---|
| 2,333,343 | Sendzimir | Nov. 2, 1943 |
| 2,687,500 | Jones et al. | Aug. 24, 1954 |
| 2,816,355 | Herman | Dec. 17, 1957 |
| 2,849,312 | Peterman | Aug. 26, 1958 |
| 2,851,133 | Steele | Sept. 9, 1958 |
| 2,926,761 | Herbert | Mar. 1, 1960 |
| 2,957,235 | Steinberg | Oct. 25, 1960 |
| 2,974,369 | Orthuber et al. | Mar. 14, 1961 |
| 2,985,411 | Madden | Mar. 23, 1961 |